United States Patent
Lam et al.

(10) Patent No.: US 10,852,558 B2
(45) Date of Patent: Dec. 1, 2020

(54) NEAR-EYE DISPLAY (NED) SYSTEM AND METHOD USING FLEXIBLE REFLECTOR

(71) Applicant: FACEBOOK TECHNOLOGIES, LLC, Menlo Park, CA (US)

(72) Inventors: Wai Sze Tiffany Lam, Menlo Park, CA (US); Ying Geng, Menlo Park, CA (US); Scott McEldowney, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/111,907

(22) Filed: Aug. 24, 2018

(65) Prior Publication Data
US 2020/0064641 A1    Feb. 27, 2020

(51) Int. Cl.
*G02B 27/01* (2006.01)
*G02B 26/08* (2006.01)
*F21V 8/00* (2006.01)

(52) U.S. Cl.
CPC ....... *G02B 27/0179* (2013.01); *G02B 6/0016* (2013.01); *G02B 6/0055* (2013.01); *G02B 26/0825* (2013.01); *G02B 27/0172* (2013.01); *G02B 2027/0178* (2013.01); *G02B 2027/0187* (2013.01)

(58) Field of Classification Search
None
See application file for complete search history.

(56) References Cited

U.S. PATENT DOCUMENTS

| | | |
|---|---|---|
| 2015/0168731 A1 | 6/2015 | Robbins |
| 2017/0007182 A1 | 1/2017 | Samec et al. |
| 2018/0059297 A1 | 3/2018 | Peroz et al. |
| 2018/0239147 A1* | 8/2018 | Schowengerdt ... G02B 27/0172 |

FOREIGN PATENT DOCUMENTS

WO    2018017751 A1    5/2018

OTHER PUBLICATIONS

International Search Report and Written Opinion dated May 24, 2019, in International Application No. PCT/US2019/015488, filed on Jan. 28, 2019 (12 pages).

* cited by examiner

*Primary Examiner* — Darryl J Collins
*Assistant Examiner* — Journey F Sumlar
(74) *Attorney, Agent, or Firm* — Millburn IP PLLC

(57) ABSTRACT

A device and method are provided. The device comprises a reflector having variable optical power; and a waveguide display assembly optically coupled to the reflector and having a light source. The waveguide display assembly is configured to guide light from the light source to transmit in a first direction towards the reflector for a first optical path, and in a second direction towards an eye-box of the device for a second optical path. The reflector is configured to reflect the light in the first direction towards the eye-box.

20 Claims, 10 Drawing Sheets

US 10,852,558 B2

NEAR-EYE DISPLAY (NED) SYSTEM AND METHOD USING FLEXIBLE REFLECTOR

BACKGROUND

Currently, most near-eye displays in virtual-reality (VR) systems and/or augmented-reality (AR) systems have design criteria to be compact and light weight, and have high resolution, large field of view (FOV), and small form factors. Thus, near-eye displays generally have a display element that generates image light that directly passes through one or more lenses before reaching a user's eyes, which can impact the requirement to provide a comfortable visual experience for users of the near-eye displays.

Further, current VR/AR near-eye displays are often having the so-called vergence-accommodation conflict, where a stereoscopic image pair drives the vergence state of a user's human visual system to arbitrary distances, but the accommodation or focusing state of the user's eyes is optically driven towards a fixed distance. The vergence-accommodation conflict causes eye strain or headaches during prolonged VR/AR sessions, significantly degrading the visual experience of the users.

The disclosed devices and methods are directed to solve one or more problems set forth above and other problems.

BRIEF SUMMARY OF THE DISCLOSURE

One aspect of the present disclosure provides a device. The device comprises a reflector having variable optical power; and a waveguide display assembly optically coupled to the reflector and having a light source. The waveguide display assembly is configured to guide light from the light source to transmit in a first direction towards the reflector for a first optical path, and in a second direction towards an eye-box of the device for a second optical path. The reflector is configured to reflect the light in the first direction towards the eye-box.

Another aspect of the present disclosure provides a method, comprising: guiding light from a light source of a waveguide display assembly to transmit in a first direction towards a reflector for a first optical path, and in a second direction towards an eye-box of a device for a second optical path; and reflecting the light transmitted in the first direction towards the eye-box. The waveguide display assembly is optically coupled to the reflector, and the reflector has variable optical power.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

Figure 1:
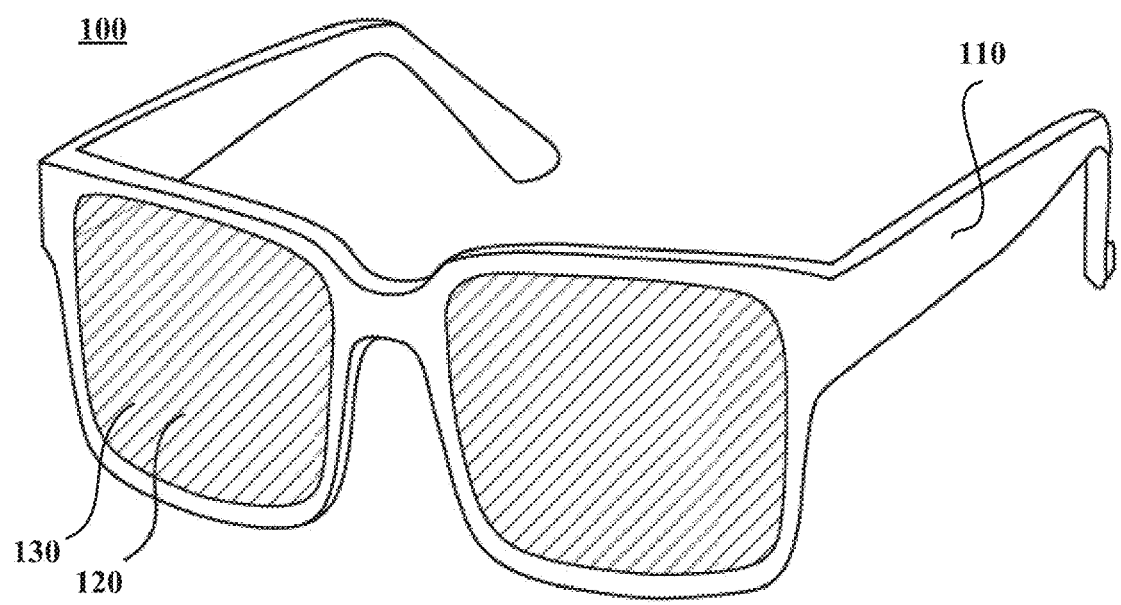
FIG. 1 illustrates a diagram of an embodiment of a near-eye display.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Conventional near-eye displays generally have a display element that generates image light that passes through one or more lenses before reaching a user's eyes. When viewing a virtual object displayed by the display element, the user's eyes rotate so that the views from the left and right eyes converge at a fixed distance in space corresponding to the location of the virtual object. This distance is referred as the vergence distance. However, because the display element is often positioned at a fixed distance from the user's eyes, the image light coming from all the virtual objects displayed by the display element is coming from the same distance. That is, no matter whether it is a near virtual object or a far virtual object, the accommodation of the user's eyes (i.e., the deformation of the crystalline lens in the user's eyes) never changes. In other words, the accommodation distance of the near virtual object and the far virtual object does not change, which causes conflict with the vergence distance.

The vergence-accommodation conflict may become even worse when multiple virtual objects are displayed across a wide range of distances to the user from very close to far away, and/or when the display augments a relatively close real-world scene with the virtual objects, which significantly degrade the user's viewing experience.

The present discourse provides an improved near-eye display capable of addressing the vergence-accommodation conflict and enhancing the viewing experience. FIG. 1 illustrates a diagram of an embodiment of a near-eye display 100. The near-eye display 100 may present media to a user, such as one or more images, video, and/or audio. In one embodiment, audio may be presented via an external device (e.g., speakers and/or headphones), which receives audio information from the near-eye display 100 and/or a console and presents audio data based on the audio information. The near-eye display 100 may be operate as an augmented reality (AR) display, a virtual reality (VR) display, and/or a mixed reality (MR) display.

As shown in FIG. 1, the near-eye display 100 may include a frame 110, a display 120, and a reflector 130. The frame 11 may include any appropriate type of mounting structure to ensure the display 120 to be viewed as a near-eye display (NED) by a user. The display 120 may be configured for the user to see content presented by the near-eye display 100. In one embodiment, the display 120 may comprise a waveguide display assembly for guiding light from one or more images to transmit towards the reflector 130 and the eyes of the user, and the reflector 130 may be optically coupled to the waveguide display assembly to reflect the light incident onto the reflector 130 towards the eyes of the user. In particular, the reflector 130 may have variable optical power for achieving distance accommodation.

Figure 2:
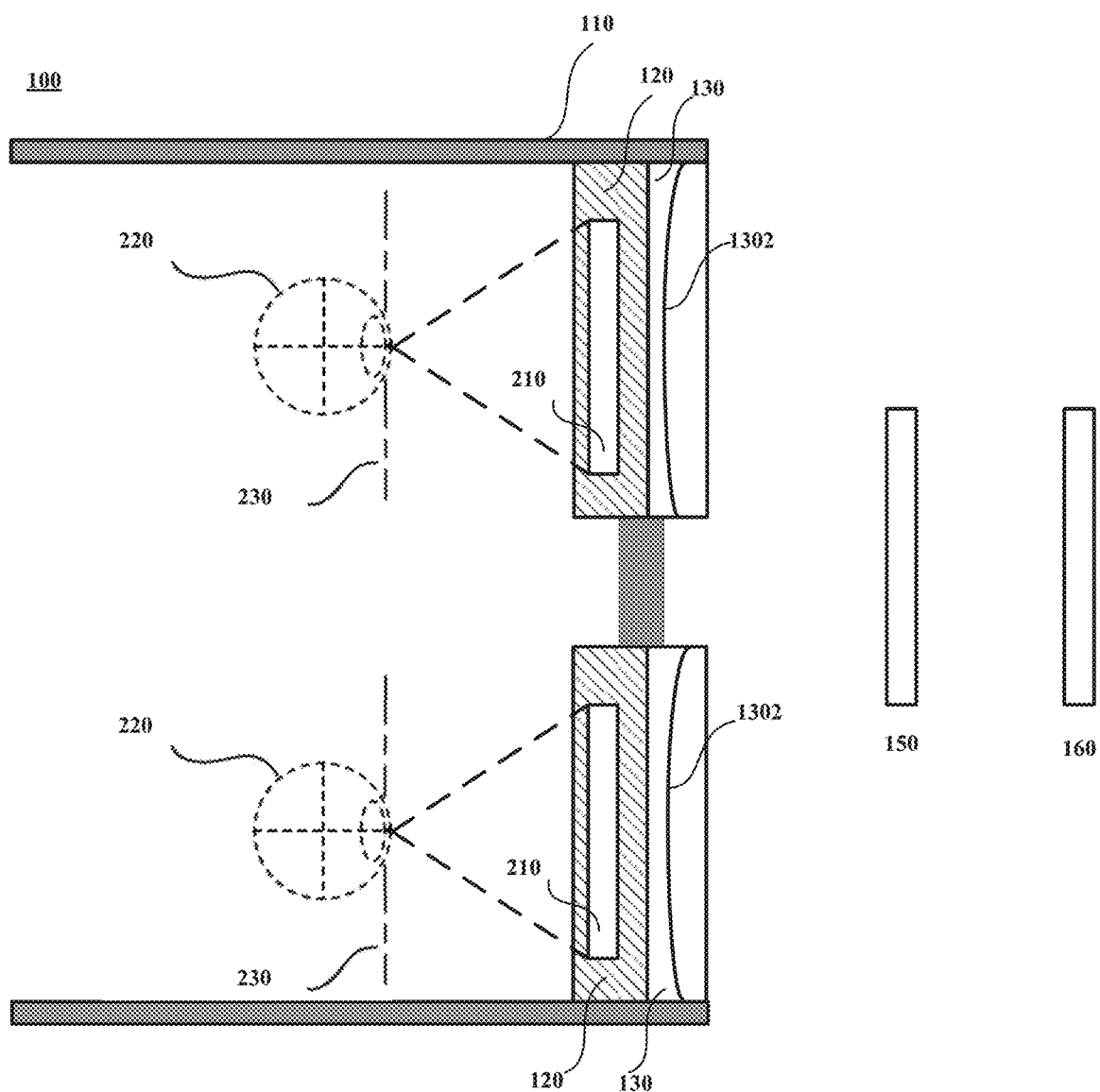
FIG. 2 illustrates an embodiment of a cross section of the near-eye display.

FIG. 2 illustrates an embodiment of a cross section of the near-eye display shown in FIG. 1. As shown in FIG. 2, the display 120 may include at least one waveguide display assembly 210 for each eye 220 of the user. The waveguide display assembly 210 for one eye may be separated or partially separated from the waveguide display assembly 210 for the other eye. In certain embodiments, a single waveguide display assembly 210 may be used for both eyes 220 of the user. An exit pupil 230 may be a location where the eye 220 is positioned in an eye-box region when the user wears the near-eye display 100.

The waveguide display assembly 210 may be optically coupled to the reflector 130, configured to generate and display one or more images (i.e., one or more stereoscopic image pairs), and guide the image light from one or more images to transmit in a first direction towards the reflector 130 for a first optical path, and in a second direction towards an eye-box located at the exit pupil 230 for a second optical path. In particular, the waveguide display assembly 210 may be configured to suppress the image light in the second direction while passing through the image light in the first direction reflected by the reflector 130. The images displayed by the waveguide display assembly 210 may include images of real-world objects and/or computer-generated objects, such as text or graphical images. The real-world objects and computer-generated objects included in the images displayed by the waveguide display assembly 210 are referred herein as virtual objects.

The waveguide display assembly 210 may be composed of one or more materials (e.g., plastic, glass, etc.) with one or more refractive indices. In certain embodiments, the near-eye display 100 may include one or more optical elements disposed between the waveguide display assembly 210 and the eye 220. The waveguide display assembly 210 may include a stack of one or more waveguide displays including, but not limited to, a stacked waveguide display, etc. In certain embodiments, the stacked waveguide display may be a polychromatic display (e.g., a red-green-blue (RGB) display) created by stacking waveguide displays whose respective monochromatic sources are of different colors. For example, the stacked waveguide display may be a polychromatic display which is able to be projected on multiple planes (e.g. multi-planar colored display). In certain embodiments, the stacked waveguide display may be a monochromatic display which is able to be projected on multiple planes (e.g. multi-planar monochromatic display).

The reflector 130 may be configured to reflect the image light in the first direction to the eye-box and to the eye 220, thereby reflecting the image generated by the waveguide display assembly 210 into the user's eye 220 via the eye-box. The reflector 130 for one eye 220 of the user may be separated, or partially separated from the reflector 130 for another eye 220 of the user, and the two reflectors may be individually or integrally controlled. Although two reflectors are used for illustration, in certain embodiments, a single reflector may be used, and may be controlled for one or more eyes.

In certain embodiments, the reflector 130 may be able to adjust focus over a continuous range of 0 to −f (e.g., 0 to −2 Diopters) for the image light incident thereon, where f is a upper focal length limit. In certain embodiments, the reflector 130 may include two substrates, a deformable membrane 1302, a reflective coating coated on the deformable member, and one or more optical fluids enclosed between each substrate and the deformable membrane 1302. The optical fluids at both sides of the deformable membrane 1302 may have the same or different refractive index. The reflector having such a structure is often referred as a fluid-filled liquid membrane reflector/mirror.

The deformable membrane 1302 and the reflective coating together may form an optical interface of the reflector 130. The reflective coating may reflect the image light in the first direction to the eye-box and to the eye 220, thereby reflecting the image generated by the waveguide display assembly 210 into the user's eye 220 via the eye-box. The reflector 130 may provide an adjustable range of optical power which is based in part on adjusting a curvature of the deformable membrane 1302. The reflector 130 having a variable optical power (i.e., focal length) is often named as a flexible reflector, a variable reflector, and a tunable reflector, etc.

The substrate and the optical fluids may be substantially transparent in the optical band of interest (e.g., visible, infrared etc.). In certain embodiments, the substrate may be flat, in certain other embodiments, the substrate may be curved. For example, the substrate may be a convex substrate or a concave substrate, both of which may adjust optical power (increase or decrease) but at the expense of increasing total thickness. There are two types of fluid-filled liquid membrane reflectors: constant fluid volume and variable fluid volume. A constant fluid volume liquid membrane reflector is desired in the near-eye display, because of the compact design requirements. The constant fluid volume liquid membrane reflector has a fixed volume of fluid which is encapsulated between a transparent deformable membrane and a rigid transparent substrate. To adjust the focal length, one portion of the membrane moves downward, other portion of the membrane moves upwards and form a lens of variable powers. Further, the reflector 130 may be any appropriate reflectors having a variable focal length, which is not limited by the present disclosure.

When the deformable membrane 1302 in the reflector 130 is adjusted, the focal length of the reflector 130 may be adjusted to different degrees to change the distance at which the virtual object is perceived to be in focus, i.e., change the accommodation distance of the virtual object that the user is currently looking at. For example, as shown in FIG. 2, when the focal length of the reflector 130 increases, the distance at which the virtual object is perceived to be in focus may move away from the eye-box; and when the focal length of the reflector 130 decreases, the distance at which the virtual object is perceived to be in focus may move towards the eye-box. That is, through adjusting the focal length, the reflector 130 may be able to provide accommodation cues, for example, from optical infinity to as close as the near point of the eyes.

Thus, for any virtual objects displayed by the waveguide display assembly 120, according to the vergence distance of a virtual object that the user is currently looking at, the reflector 130 may be able to change the focal length to provide an accommodation distance which is in sync with the vergence distance of the virtual object that the user is currently looking at. Accordingly, the vergence-accommodation conflict in the near-eye display may be eliminated, and the viewing experience may be significantly enhanced.

In certain embodiments, the reflector 130 may be partially transparent and partially reflective and, thus, the virtual object displayed by the waveguide display assembly 210 may be optically combined with a view of real-world objects (i.e., superimposed on the user's view of real world scene), achieving an optical see-though AR near-eye display. When viewing real-world objects, the user's eyes rotate so that the views from the left and right eyes converge at a fixed distance in space corresponding to the location of the real-world object being viewed. This distance is referred as the vergence distance of the real-world object. In particular, the reflector 130 may adjust the focal length, such that the distance where the virtual object displayed by the waveguide display assembly 210 is perceived to be in focus may be corresponding to the vergence distance where the user's eyes are currently focusing on a real-world object viewed through the near-eye display. Thus, the user may be able to perceive the real-world object and the virtual object displayed by the waveguide display assembly 210 to be in focus simultaneously.

Further, after the real-world object that the user's eyes are currently focusing on changes, the vergence distance of the real-world object that the user's eyes are currently focusing on may also change. The reflector 130 may be able to adjust the focal length to change the distance where the virtual object displayed by the waveguide display assembly 210 is perceived to be in focus in correspondence with a change in the vergence distance.

For example, as shown in FIG. 2, when the user is currently focusing on a far object 160 viewed through the AR near-eye display, the reflector 130 may adjust the deformable membrane 1302 to change the focal length for the image light incident thereon, such that the virtual object displayed by the waveguide display assembly 210 may appear to be in focus at the distance of the far object 160 from the user, i.e., at the vergence distance where the user's eyes are currently focusing on the far object 160 viewed through the AR near-eye display. After the user changes his focusing from the far object 160 to a near object 150 viewed through the AR near-eye display, the reflector 130 may adjust the deformable membrane 1302 to reduce the focal length, such that the virtual object may appear to be in focus at the distance of the near object 150 from the user, i.e., at the vergence distance where the user's eyes are currently focusing on the near object 150 viewed through the AR near-eye display.

Thus, through adjusting the focal length of the reflector 130, the distance where the virtual object is perceived to be in focus may be configured to match the vergence distance of the real-world object where the user's eyes are currently focusing on, and the viewing experience may be significantly enhanced. In addition, complex optical components may not be involved to place the virtual objects and real-world objects in front of the eyes, which allows for a large field of view (FOV) and a small form factor in the optical see-though AR near-eye display.

In certain embodiments, the transmittance and/or reflectivity of the reflector 130 may be adjusted according to various application scenarios. For example, when the ambient light (i.e., light which is from external environment of the near-eye display rather than the display 120) is substantially strong, the transmittance of the reflector 130 may be reduced and/or the reflectivity of the reflector 130 may be increased, such that the images displayed by the waveguide display assembly 210 may not be washed out by the strong ambient light. Further, the transmittance of the reflector 130 may be equal or unequal to the reflectivity of the reflector 130.

In certain embodiments, the reflectivity of the reflector 130 may be significantly larger than the transmittance of the reflector 130, such that the user may only perceive the virtual objects displayed by the waveguide display assembly 210. That is, a VR near-eye display may be realized, where the reflector 130 changes the focal length to provide an accommodation distance which is in sync with the vergence distance of the virtual object that the user is currently looking at.

Figure 3:
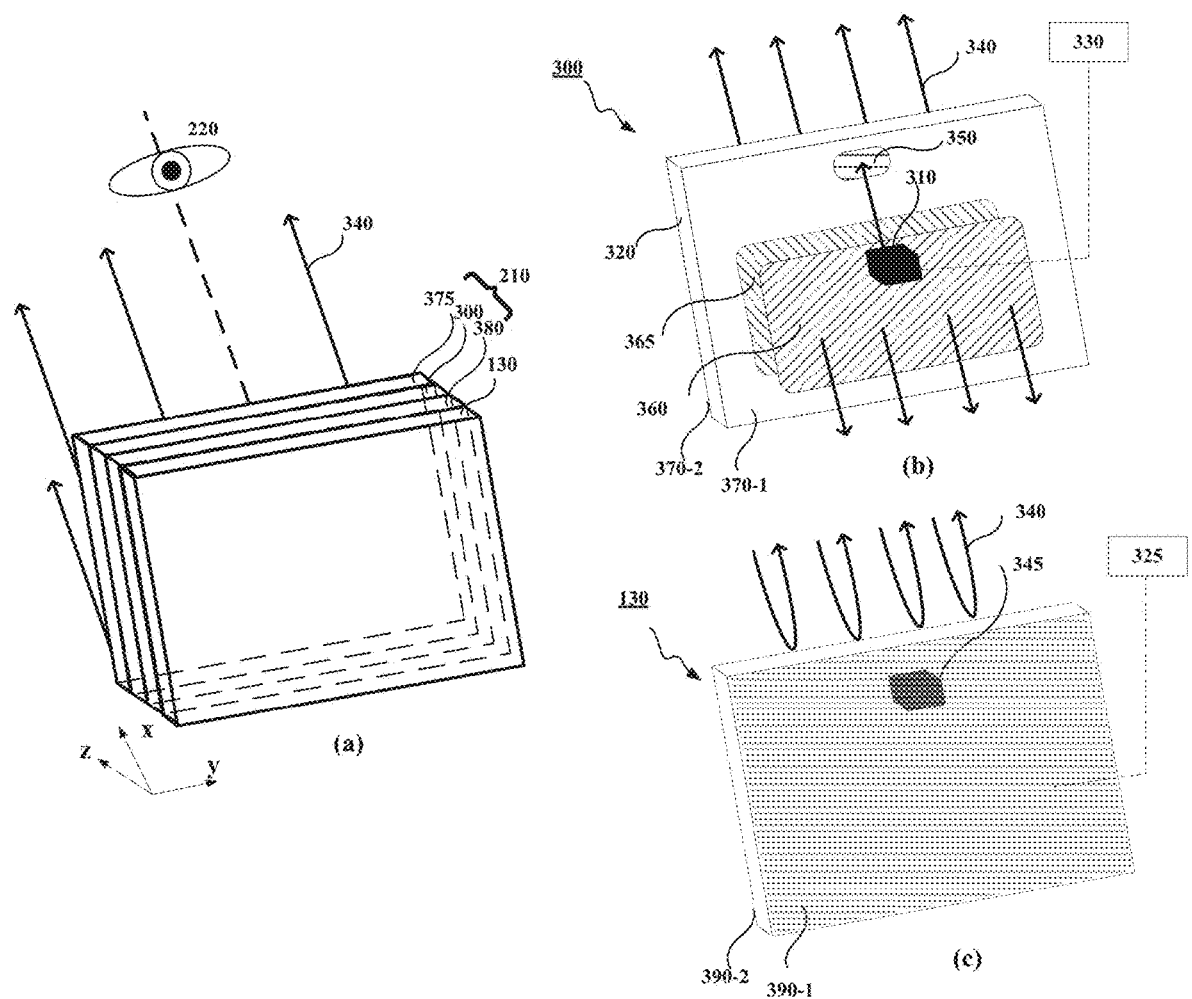
FIG. 3 illustrates an isometric view of an embodiment of a waveguide display assembly and reflector.

FIG. 3 illustrates an isometric view of an embodiment of a waveguide display assembly 210 and an embodiment of a reflector 130. For purposes of illustration, FIG. 3 merely shows the cross section associated with a single eye 220, a single waveguide display assembly 210, a single reflector 130, a single eye-tracking device 345 and a single reflector controller 325, but a second waveguide display assembly and/or a second reflector and/or a second eye-tracking device and/or reflector controller may be used for a second eye of the user.

As shown in section (a) of FIG. 3, the waveguide display assembly 210 may include a polarizer 375, a waveguide display 300, and a phase-modulator 380. In one embodiment, the waveguide display 300 may be a component (e.g., the waveguide display assembly 210) of the near-eye display 100. In another embodiment, the waveguide display 300 may be part of some other near-eye display or other system that directs image light to a particular location.

As shown in section (b) of FIG. 3, the waveguide display 300 may include a source assembly 310, an output waveguide 320, and a source controller 330. The source assembly 310 may generate image light 340 and output the image light 340 to a coupling element 350 located on a first side 370-1 of the output waveguide 320. The output waveguide 320 may be an optical waveguide that outputs expanded image light 340 to an eye 220 of the user and the reflector 130. The output waveguide 320 may receive the image light 340 at one or more coupling elements 350 located on the first side 370-1, and guide received input image light 340 to both a first decoupling element 360 and a second decoupling element 365. In certain embodiments, the coupling element 350 may couple the image light 340 from the source assembly 310 into the output waveguide 320. The coupling element 350 may be, for example, a diffraction grating, a holographic grating, one or more cascaded reflectors, one or more prismatic surface elements, and/or an array of holographic reflectors.

The second decoupling element 365 may redirect the received input image light 340 to the first decoupling element 360, such that the received input image light 340 may be decoupled out of the output waveguide 320 via the first decoupling element 360 and directed to the reflector 130. Meanwhile, the first decoupling element 360 may redirect the received input image light 340 to the second decoupling element 365, such that the received input image light 340 may be decoupled out of the output waveguide 320 via the second decoupling element 365 and directed to the eye 220.

The first decoupling element 360 may be part of, or affixed to, the first side 370-1 of the output waveguide 320. The second decoupling element 365 may be part of, or affixed to, the second side 370-2 of the output waveguide 320, such that the first decoupling element 360 may be arranged opposite to the second decoupling element 365. The first decoupling element 360 and/or the second decoupling element 365 may be, e.g., a diffraction grating, a holographic grating, one or more cascaded reflectors, one or more prismatic surface elements, and/or an array of holographic reflectors.

The second side 370-2 represents a plane along a x-dimension and a y-dimension. The output waveguide 320 may be composed of one or more materials that facilitate total internal reflection of the image light 340. The output waveguide 320 may be composed of, for example, silicon, plastic, glass, and/or polymers. The output waveguide 320 may have a relatively small form factor. For example, the output waveguide 320 may be approximately 50 mm wide along x-dimension, 30 mm long along y-dimension and 0.5-1 mm thick along a z-dimension.

The source controller 330 may control scanning operations of the source assembly 310. The source controller 330 may determine scanning instructions for the source assembly 310. In certain embodiments, the output waveguide 320 may output expanded image light 340 to the reflector 130 with a large FOV. For example, after the expanded image light 340 received by the reflector 130 is reflected back to the user's eye 220, the expanded image light 340 provided to the user's eye 220 may have a diagonal FOV (in x and y) of 60 degrees and or greater and/or 150 degrees and/or less. The output waveguide 320 may be configured to provide an eye-box with a length of 20 mm or greater and/or equal to or less than 50 mm, and/or a width of 10 mm or greater and/or equal to or less than 50 mm.

Using a waveguide display 300, the physical display and electronics may be moved to the side (near the user's temples) and a fully unobstructed view of the real world may be achieved, therefore opening up the possibilities to true AR experiences.

As shown in section (c) of FIG. 3, the reflector 130 may include a first substrate 390-1 and a second substrate 390-2 for sealing one or more optical fluids, a deformable membrane, and a reflective coating coated on the deformable member. The second substrate 390-2 may be facing the first side 370-1 of the output waveguide 320, and receive the image light 340 decoupled from the first decoupling element 360. The image light incident onto the reflector 130 through the second substrate 390-2 may be reflected by the reflective coating towards the eye 220. The substrates 390-1 and 390-2 may be substantially transparent in the visible band (~380 nm to 750 nm), and in certain embodiments, may also be transparent in some or all of the infrared (IR) band (~750 nm to 1 mm). The substrates 390-1 and 390-2 may be composed of, e.g., $SiO_2$, plastic, sapphire, etc. Detail structure of the reflector 130 will be discussed below with regard to FIG.4.

The reflector 130 may be coupled to a reflector controller 325 and an eye-tracking device 345. The eye-tracking device 345 may be configured to track the user's eyes and provide eye-tracking information to the reflector controller 325. Based on the eye-tracking information, the reflector controller 325 may be configured to determine a vergence distance at which the eyes are currently focusing on. Based on the determined vergence distance, the reflector controller 325 may control the reflector 130 to adjust the focal length, thereby enabling the virtual object to be perceived in focus at a distance corresponding to the vergence distance. In addition, after determining a change in the vergence distance, the reflector controller 325 may control the reflector 130 to adjust the focal length, thereby changing the distance at which the virtual object is perceived to be in focus in correspondence with the change in the vergence distance.

The eye-tracking device 345 may be any appropriate tracking devices capable of the tracking the movement of the eyeballs, based on which the vergence distance at which the eyes are currently focusing on is determined. In certain embodiments, the eye-tracking device 345 may be a gaze tracker which includes gaze tracking cameras for each eye of the user, and the reflector controller 325 may determine the vergence distance based on the tracked gaze of the user.

In addition, FIG. 3 shows the reflector controller 325 for controlling the reflector 130 and the source controller 330 for controlling the source assembly 310 are independent. However, in certain embodiments, the reflector controller 325 and the source controller 330 may be integrated into one controller.

As shown in the section (a) of FIG. 3, the phase-modulator 380 may be disposed between the first decoupling element 360 and the reflector 130, and the polarizer 375 may be disposed between the second decoupling element 365 and eye 200. In one embodiment, the polarizer 375 may be a linear polarizer, the phase-modulator 380 may be a quarter-wave plate (QWP), and the quarter-wave plate 380 may be oriented relative to the linear polarizer 375 to convert linearly polarized light to circularly polarized light and vice versa for visible spectrum and/or infrared spectrum. In certain embodiments, for an achromatic design, the quarter-wave plate 380 may be composed of multilayer birefringent material (e.g., polymer or liquid crystals) to produce quarter wave birefringence across a wide spectral range. In certain embodiments, for a simple monochrome design, an angle between a polarization axis (i.e., fast axis) of the quarter-wave plate 380 and a polarization axis (i.e., transmission axis) of the polarizer 375 may be approximately 45 degrees.

Figure 4:
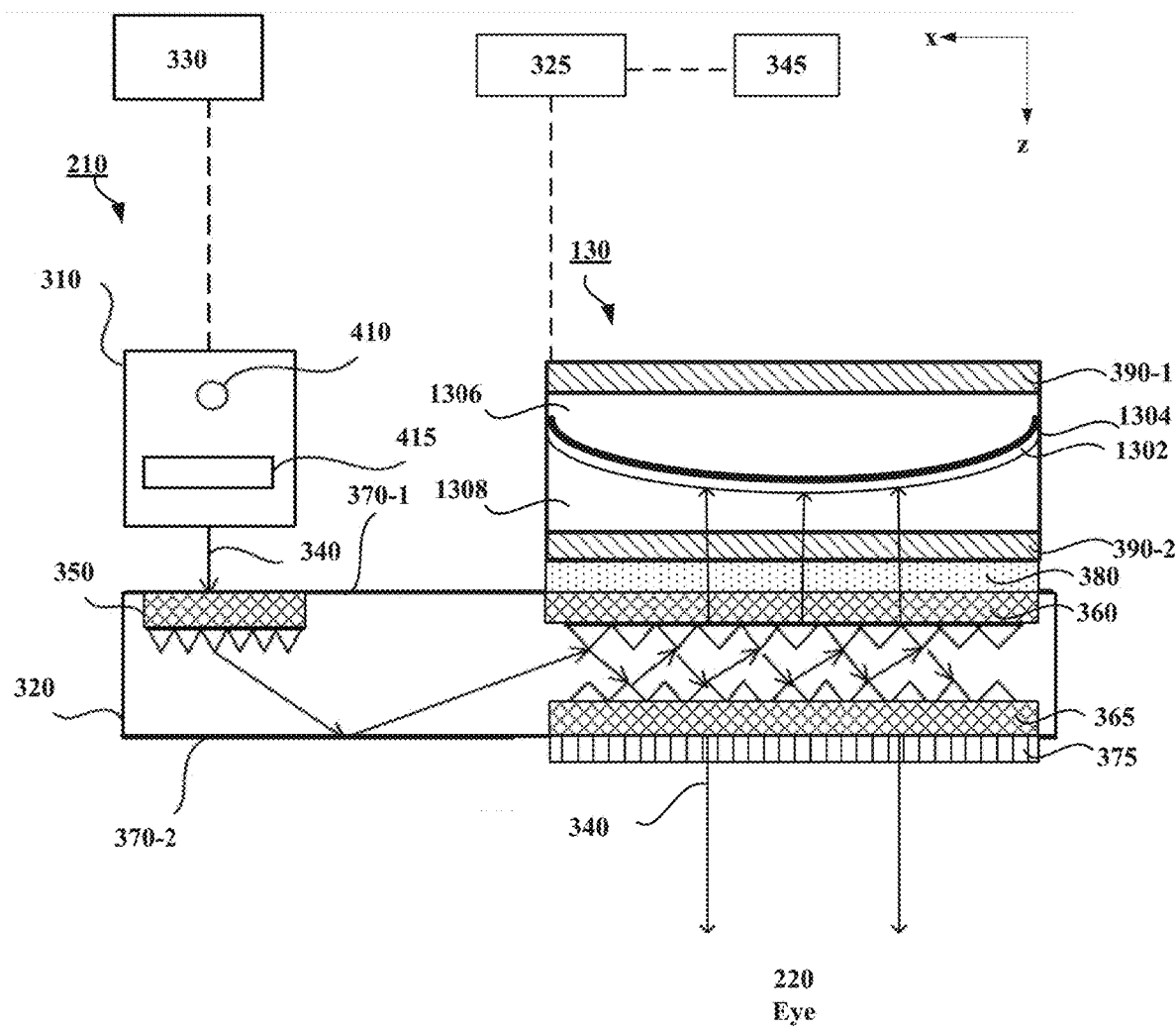
FIG. 4 illustrates a cross-sectional view of an embodiment of the waveguide display assembly and reflector.

FIG. 4 illustrates an embodiment of a cross section of the waveguide display assembly 210 and the reflector 130. As shown in FIG.4, the waveguide display 210 may include the source assembly 310 and the output waveguide 320. The source assembly 310 may generate image light 340 in accordance with scanning instructions from the source controller 330. The source assembly 310 may include a light source 410 and an optics system 415. The light source 410 may be a light source that generates coherent or partially coherent light. The light source 410 may include, for example, a laser diode, a vertical cavity surface emitting laser, and/or a light emitting diode, and the reflector 130 may have a reflective coating matching the spectral bandwidth of the light source 410. The source assembly 310 may include medium-/narrow-bandwidth light source 410. In one embodiment, the medium-/narrow-bandwidth light source 410 may have a spectral bandwidth of approximately 10-100 nm (full width at half maximum (FWHM)).

The optics system 415 may include one or more optical components that condition the light from the light source 410. Conditioning light from the light source 410 may include, e.g., polarizing, expanding, and/or collimating in accordance with instructions from the source controller 330. The one or more optical components may include one or more lens, polarizers, mirror, aperture, and/or grating. Light emitted from the optics system 415 (and also the source assembly 310) is referred to as the image light 340.

The output waveguide 320 may receive the image light 340 from the optics system 415. The coupling element 350 may couple the image light 340 from the source assembly 310 into the output waveguide 320. In one embodiment, the coupling element 350 may be a diffraction grating, a pitch of the diffraction grating may be configured such that total internal reflection occurs in the output waveguide 320, and the image light 340 propagates internally in the output waveguide 320 (e.g., by total internal reflection), toward the first decoupling element 360 and the second decoupling element 365.

The second decoupling element 365 may redirect the received input image light 340 to the first decoupling element 360, such that the received input image light 340 may be decoupled out of the output waveguide 320 via the first decoupling element 360 and directed to the reflector 130. Meanwhile, the first decoupling element 360 may redirect the received input image light 340 to the second decoupling element 365, such that the received input image light 340 may be decoupled out of the output waveguide 320 via the second decoupling element 365 and directed to the eye 220.

In certain embodiments, the first decoupling element 360 and/or the second decoupling element 365 may be structurally similar. The expanded image light 340 decoupled out of the output waveguide 320 may be expanded along one or more dimensions (e.g., elongated along y-dimension). In certain embodiments, the waveguide display 300 may include a plurality of source assemblies 310 and a plurality of output waveguides 320. Each of the source assemblies 310 may emit a monochromatic image light of a specific band of wavelength corresponding to a primary color (e.g., red, green, or blue). Each of the output waveguides 320 may be stacked together with a distance of separation to output an expanded image light 340 that is multi-colored.

The phase-modulator 380 may be disposed between the first decoupling element 360 and the reflector 130, and the polarizer 375 may be disposed between the second decoupling element 365 and eye 200. In one embodiment, the polarizer 375 may be a linear polarizer, the phase-modulator 380 may be a quarter-wave plate (QWP), and the quarter-wave plate 380 may be oriented relative to the linear polarizer 375 to convert linearly polarized light to circularly polarized light and vice versa for visible spectrum and/or infrared spectrum.

In one embodiment, as shown in FIG. 4, the reflector 130 may include a first substrate 390-1, a second substrate 390-2, a deformable membrane 1302, a reflective coating 1304, a first liquid layer 1306, and a second liquid layer 1308. The first substrate 390-1 and the second substrate 390-2 may be substances that serve as foundation for the first liquid layer 1306 and the second liquid layer 1308, respectively. The first substrate 390-1 and the second substrate 390-2 may be e.g., silicon, silicon dioxide, sapphire, plastic, or some other semiconductor that is at least partially transmissive to the image light emitted by the waveguide display assembly 210.

The deformable membrane 1302 may enclose the first liquid layer 1306 between itself and the first substrate 390-1, and enclose the second liquid layer 1308 between itself and the second substrate 390-2. In certain embodiments, the deformable membrane 1302 may enclose the second liquid layer 1308 between itself and the phase-modulator 380 and, thus, the second substrate 390-2 may be omitted. The reflective coating 1304 may be disposed on the deformable member 1304 to reflect the image light in the first direction to the eye 220, thereby reflecting the image generated by the waveguide display assembly 210 into the user's eye 220. The reflective coating 1304 may have a spectral bandwidth matching the spectral bandwidth of the light source 410. In certain embodiments, the reflective coating 1304 may be partially transparent and partially reflective, and made of metal materials, for example, silver.

The first liquid layer 1306 and the second liquid layer 1308 each may include at least one optical fluid, e.g., water, oil, etc., which may be substantially transmissive (i.e., transparent) to light emitted by the waveguide display assembly 210. In certain embodiments, the first substrate 390-1 and the second substrate 390-2 may be flat, and the optical fluids included in the first liquid layer 1306 and the second liquid layer 1308 may have the same refractive index, which is intended to produce zero optical power for the transmitted ambient light. Thus, for the user with perfect vision, the real-world objects viewed through the near-eye display stay unaltered. For the short-sighted/long-sighted user, the first substrate 390-1 and/or the second substrate 390-2 may be a concave/convex substrate, providing an overall −Ve/+Ve optical power to correct the user vision. Thus, the real-world objects viewed through the near-eye display stay clear to the short-sighted/long-sighted user. In certain embodiments, the optical fluids included in the first liquid layer 1306 and the second liquid layer 1308 may have a different refractive index for correcting the user vision for the short-sighted/long-sighted user.

The reflector controller 325 may control a voltage applied to the deformable membrane 1302 to dynamically control, over a continuous range, an amount of optical power associated with the reflector 130. That is, controlled by the reflector controller 325, the reflector 130 may provide a continuous range of adjustment of optical power for the image light incident thereon. In response to an applied voltage, a top portion of the deformable membrane 1302 may move downward and a bottom portion of the deformable membrane 1302 may move upwards which causes curvature in the deformable membrane 1302, thereby causing a change in the optical power for the image light incident thereon. Accordingly, the reflector 130 may be able to vary a position of the top and/or bottom portion of the deformable membrane 1302 to cause a variation in the optical power (e.g., to adjust optical power by 0 to −D before getting in the gravity deformation degradation in a vertically aligned configuration) for the image light incident thereon. In certain embodiments, the first substrate 390-1 and the second substrate 390-2 each may be disposed with a transparent indium tin oxide (ITO) electrode, and the reflector controller 325 may control a voltage applied to the deformable membrane 1302 through controlling voltages applied to the ITO electrodes.

In the operation of the see-through AR near-eye display, the eye-tracking device 345 may track the user's eyes and provide the eye-tracking information to the reflector controller 325. Based on the received eye-tracking information, the reflector controller 325 may first determine a vergence distance of a real-word object at which the eyes are currently focusing on viewed through the AR near-eye display, then apply a corresponding voltage to the reflector 130 to adjust the focal length. Thus, the virtual object displayed by the waveguide display assembly 210 may be perceived in focus at a distance corresponding to the vergence distance of the real-word object where the user is currently focusing.

For example, referring to FIG. 2 and FIG.4, after the reflector controller 325 determines the user is currently focusing on the far object 160 viewed through the AR near-eye display, based on the eye-tracking information received from the eye-tracking device 345, the reflector controller 325 may determine the vergence distance where the user's eyes are currently focusing on the far object 160. Based on the determined the vergence distance, the reflector controller 325 may apply a corresponding voltage to the deformable membrane 1302, enabling the deformable membrane 1302 to have a first curvature. Accordingly, the reflector 130 may exhibit a corresponding focal length for the image light incident thereon, such that the virtual object displayed by the waveguide display assembly 210 may be perceived in focus at a distance corresponding to the vergence distance where the user's eyes are currently focusing on the far object 160 viewed through the AR near-eye display.

After the eye-tracking device 345 detects the user changes his focusing from the far object 160 to the near object 150 viewed through the AR near-eye display, the reflector controller 325 may determine the vergence distance where the user's eyes are currently focusing on the near object 150. Then the reflector controller 325 may adjust the voltage applied to the deformable membrane 1302, enabling the deformable membrane 1302 to have a second curvature which is larger than the first curvature. Thus, the focal length of the reflector 130 may be decreased, and the virtual object displayed by the waveguide display assembly 210 may be perceived in focus at a distance corresponding to the vergence distance where the user's eyes are currently focusing on the near object 150.

Thus, through adjusting the focal length of the reflector 130 (i.e., the curvature of the deformable member 1302), the distance where the virtual object is perceived to be in focus may be configured to match the vergence distance of the real-world object where the user's eyes are currently focusing on. Accordingly, the user may be able to perceive the real-world object viewed through the near-eye display and the virtual object displayed by the waveguide display assembly 210 to be in focus simultaneously, and the viewing experience may be significantly enhanced. In addition, the reflector 130 may be substantially thin (e.g., have a thickness of ~2 mm), making it useful for applications with a near-eye display or more generally devices where a small form factor and weight are considerations.

Figure 5:
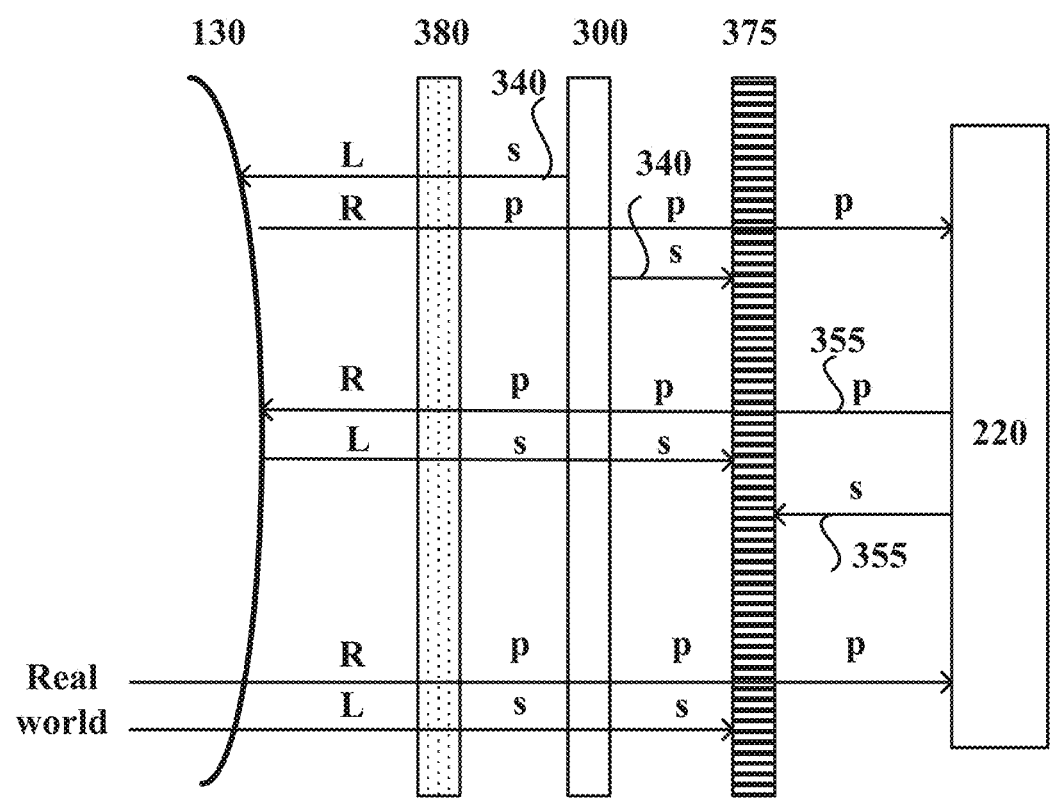
FIG. 5 illustrates a simplified cross-sectional view of an optical path of an embodiment of the waveguide display assembly and reflector.

FIG. 5 illustrates a simplified cross-sectional view of an optical path of an embodiment of the waveguide display assembly and reflector. As shown in FIG. 5, the image light 340 decoupled out of the waveguide display 300 (i.e., the output waveguide 320 of the waveguide display 300 of the waveguide display assembly 210 shown in FIG. 3) may be linearly polarized light having a first polarizing direction. The waveguide display assembly including the waveguide display 300, the quarter-wave plate 380 and the linear polarizer 375 may be configured to guide the decoupled image light to transmit in a first direction towards the reflector 130 for a first optical path, and into a second direction towards the eye 220 of the user for a second optical path.

The quarter-wave plate 380 may be disposed in the first optical path and between the waveguide display 300 and the reflector 130, and the linear polarizer 375 may be disposed in the second optical path before the eye 220 of the user. The polarization axis of the linear polarizer 375 may be arranged to be orthogonal to the first polarizing direction, and the quarter-wave plate 380 may be oriented relative to the linear polarizer 375 to convert linearly polarized light to circularly polarized light and vice versa for visible spectrum and/or infrared spectrum. In certain embodiments, for an achromatic design, the quarter-wave plate 380 may be composed of multilayer birefringent material (e.g., polymer or liquid crystals) to produce quarter wave birefringence across a wide spectral range. In certain embodiments, for a simple monochrome design, an angle between a polarization axis (i.e., fast axis) of the quarter-wave plate 380 and a polarization axis (i.e., transmission axis) of the polarizer 375 may be approximately 45 degrees.

The quarter-wave plate 380 may change a polarizing direction of the image light reflected by the reflector 130 into a second polarizing direction orthogonal to the first polarizing direction. The linear polarizer 375 may pass the reflected image light in the second polarizing direction, and block the image light in the second optical path and in the first polarizing direction. Thus, the eye 220 of the user may only perceive the image light based on the decoupled image light 340 transmitting into the first direction.

In addition, because the reflector 130 is partially transparent and partially reflective, ambient light from environment may sequentially pass through the reflector 130, the quarter-wave plate 380, the waveguide display 300 and the linear polarizer 375 to reach the eye 220. In particular, the liner polarizer 375 may pass a portion of the ambient light in the second polarizing direction to be perceived by the eye 220 together with the reflected image light in the second polarizing direction. Thus, the virtual object displayed by the waveguide display 300 of the waveguide display assembly may be optically combined with a view of real-world objects.

In one embodiment, as shown in FIG. 5, s denotes s-polarized light, p denotes p-polarized light, R denotes right-circularly polarized light, and L denotes left-circularly polarized light. The image light 340 decoupled out of the waveguide display 300 may be s-polarized image light, and the linear polarizer 375 may be configured to pass p-polarized light and block s-polarized light. Thus, the decoupled image light 340, which is transmitted into the second direction towards the eye 220 of the user, may be blocked by the linear polarizer 375.

The decoupled image light 340, which is transmitted into the first direction towards the reflector 130, may be converted to left-circularly polarized image light after passing through the quarter-wave plate 380. The left-circularly polarized image light may be converted to right-circularly polarized image light after being reflected by the reflector 130. The right-circularly polarized image light may be converted to p-polarized image light after passing through the quarter-wave plate 380, and maintain the p-polarized state after passing through the waveguide display 300. Then, the p-polarized image light may pass through the linear polarizer 375 to be perceived by the eye 220 of the user.

On the other hand, ambient light from the environment may be decomposed into right-circularly polarized light and left-circularly polarized light, which may be converted to p-polarized light and s-polarized light after passing through the quarter-wave plate 380, respectively. The p-polarized light and s-polarized light may maintain the polarization state after passing through the waveguide display 300. Then the liner polarizer 375 may pass the p-polarized light of the ambient light to be perceived by the eye 220 of the user, while block the s-polarized light of the ambient light. Thus, the eye 220 of the user may perceive both the p-polarized light of the ambient light and the reflected p-polarized image light, and the virtual object displayed by the waveguide display 300 of the waveguide display assembly may be optically combined with a view of real-world objects.

Further, in the near-eye display, ambient light incident onto the eyes of the user may be scattered by the eyes of the user, then reflected from the display system back to the eyes. As a result, the user may see an image of his own eyes, such a phenomenon is referred as narcissus. However, as shown in FIG. 5, because the linear polarizer 375 passes p-polarized light and blocks s-polarized light, the s-polarized light 355 scattered from the eye 220 towards the waveguide display 300 may be blocked by the linear polarizer 375. Meanwhile, the p-polarized light 355 scattered from the eye 220 towards the waveguide display 300 may sequentially pass through the linear polarizer 375 and the waveguide display 300 and stay as p-polarized light, then pass through the quarter-wave plate 380 and become the right-circularly polarized light. The right-circularly polarized light may be converted to the left-circularly polarized light after being reflected by the reflector 130. The left-circularly polarized may pass through the quarter-wave plate 380 again and become s-polarized light. The s-polarized light may pass through the waveguide display 300 and stay as the s-polarized light which is blocked by the linear polarizer 375. That is, the p-polarized light 355 scattered from the eye 220 may also be blocked by the linear polarizer 375. Thus, narcissus may be suppressed, and more uniform images may be perceived by the eye 220.

Figure 6:
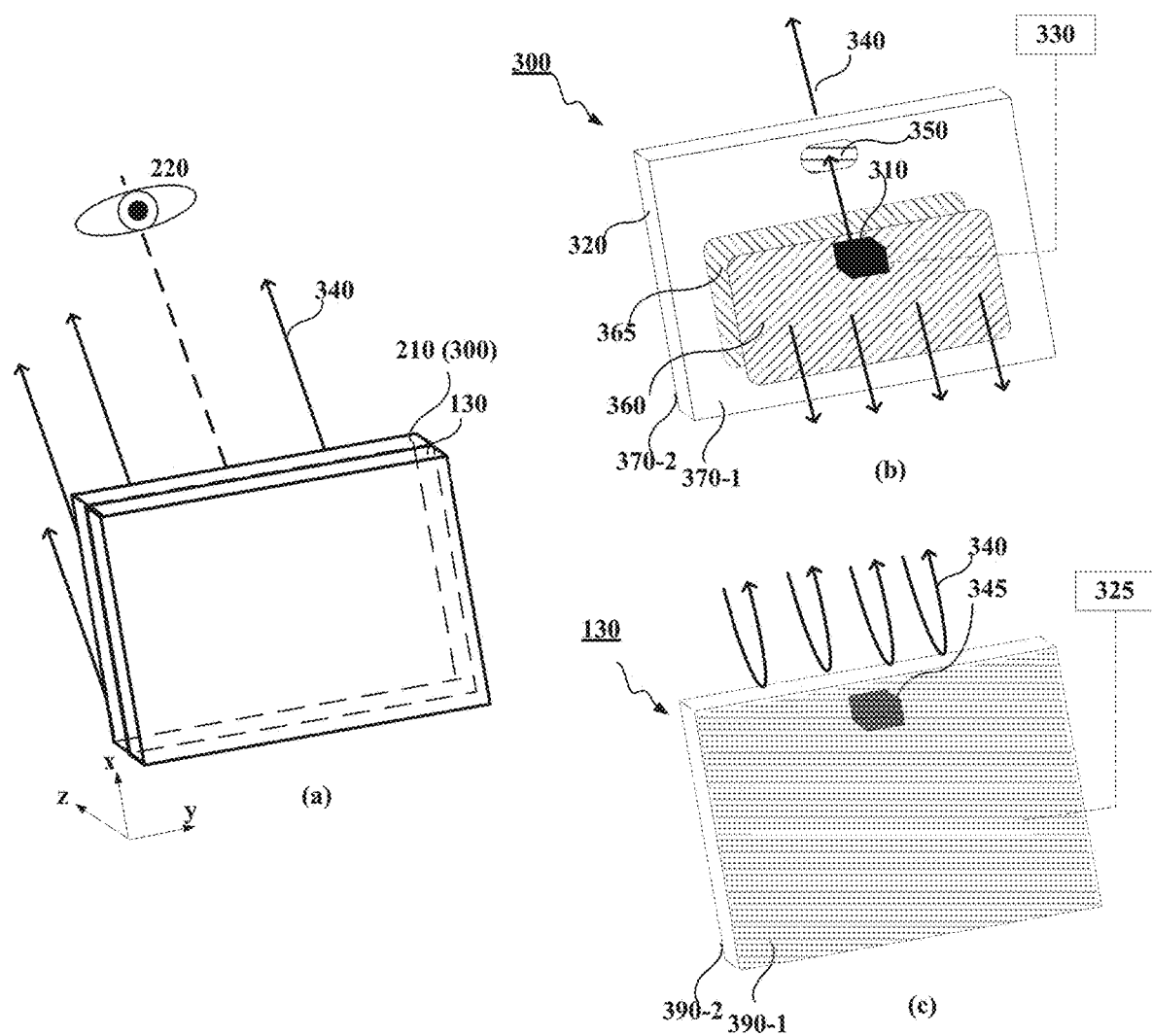
FIG. 6 illustrates an isometric view of another embodiment of a waveguide display assembly and reflector.
Figure 7:
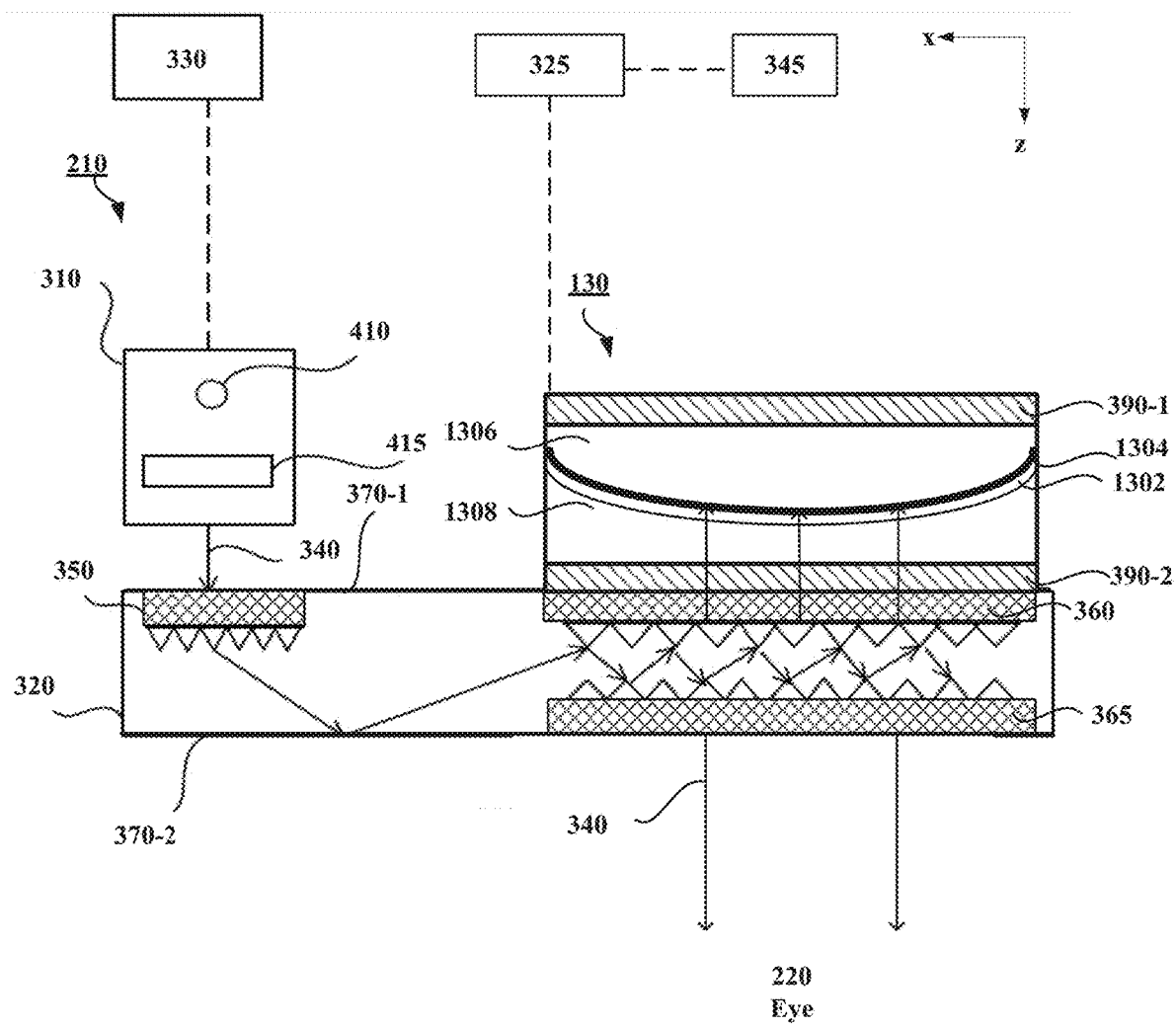
FIG. 7 illustrates a cross-sectional view of another embodiment of the waveguide display assembly and reflector.

FIG. 6 illustrates an isometric view of another embodiment of a waveguide display assembly and reflector, and FIG. 7 illustrates another embodiment of a cross section of the waveguide display assembly 210 and the reflector 130. The similarities between FIGS. 3-4 and FIGS. 6-7 are not repeated here, while certain differences are further explained.

As shown in FIG. 6, different from the waveguide display assembly in FIG. 3, the waveguide display assembly 210 shown in section (a) of FIG. 6 may include the waveguide display 300 but no longer include the phase-modulator and the polarizer. As shown in section (b) of FIG. 6, the waveguide display 300 may include a source assembly 310, an output waveguide 320, and a source controller 330. In particular, the source assembly 310 may include a very narrow-bandwidth light source 410 with a substantially-narrow spectral bandwidth, and the reflector 130 shown in section (c) of FIG. 6 may have a reflective coating 395 matching the substantially-narrow spectral bandwidth of the light source 410. In one embodiment, the substantially-narrow spectral bandwidth (FWHM) of the light source 410 may be approximately 5-10 nm.

Due to the substantially-narrow spectral bandwidth of the light source, the waveguide display assembly 210 may be able to generate a substantially high efficiency for the image light 340 from the light source 410 to transmit in a first direction towards the reflector 130 for a first optical path, and a substantially low efficiency for the image light 340 from the light source 410 to transmit in a second direction towards the eye 220 of the user for a second optical path.

In one embodiment, the output waveguide 320 of the waveguide display 300 of the waveguide display assembly 210 may include a grating, which is optically coupled to the light source 410 to make the light from the light source 410 in the first direction more efficient than the light from the light source 410 in the second direction, so as to suppress the light from the light source 410 in the second direction. Thus, the phase-modulator (e.g., quarter-wave plate) and the polarizer (e.g., linear polarizer) may be removed from the waveguide display assembly 210, and the transmittance of the real world see-through may be significantly enhanced.

For example, as shown in FIG. 7, the first decoupling element 360 and the second decoupling element 365 of the output waveguide 320 may be configured having substantially high diffraction efficiency in the −z direction and substantially low diffraction efficiency in the +z direction. Thus, most of the image light 340 from the light source 410 may be decoupled out of the first decoupling element 360 in the −z direction and transmit to the reflector 130, while a very low portion of the image light 340 may be decoupled out of the second decoupling element 365 in the +z direction and transmit to the eye 220. After the image light 340 is reflected by the reflector 130 towards the eye 220, most reflected image light may be transmitted through the first decoupling element 360 and the second decoupling element 365 to be perceived by the eye 220. Thus, the image light 340 in the first direction may be configured to have much higher efficiency than the image light 340 in the second direction and, accordingly, the eye 220 may perceive the image based on the image light 340 in the first direction.

Based on the eye-tracking information received from the eye-tracking device 345, the reflector controller 325 may be able to adjust the voltage applied to the reflector 130 to adjust the focal length, such that the virtual object displayed by the waveguide display assembly 210 may be perceived in focus at a distance corresponding to the vergence distance where the user's eyes are currently focusing on the real-world object. Accordingly, the user may perceive the real-world object viewed through the waveguide display assembly 210 and the virtual object displayed by the waveguide display assembly 210 to be in focus simultaneously, and the viewing experience may be significantly enhanced.

Figure 8:
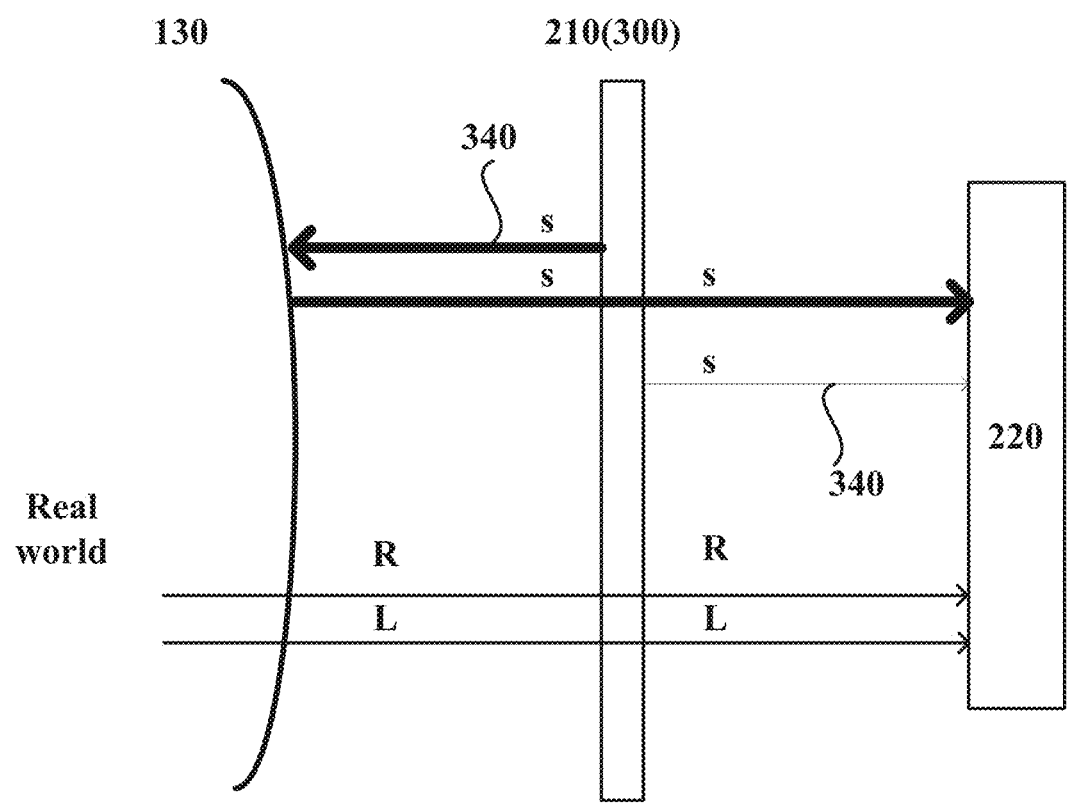
FIG. 8 illustrates a simplified cross-sectional view of an optical path of another embodiment of the waveguide display assembly and reflector.

FIG. 8 illustrates a simplified cross-sectional view of an optical path of another embodiment of the waveguide display assembly 210 and the reflector 130. As shown in FIG. 8, the image light 340 decoupled out of the waveguide display assembly 210 (i.e., the output waveguide 320 of the waveguide display 300 of the waveguide display assembly 210 in FIG.6) may be linearly polarized light having a first polarizing direction. The waveguide display assembly 210 may be configured to guide the decoupled image light 340 to transmit in a first direction towards the reflector 130 for a first optical path, and into a second direction towards the eye 220 of the user for a second optical path.

In particular, due to the substantially-narrow spectral bandwidth of the light source included in the waveguide display assembly 210, the decoupled image light 340 transmitted into the first direction towards the reflector 130 may have a substantially high efficiency, and the decoupled image light 340 transmitted into the second direction towards the eye 220 may have a substantially low efficiency. That is, the image light in the first direction has much higher efficiency than the image light in the second direction and, thus, the eye 220 may perceive the image based on the image light in the first direction.

The linearly polarized image light with the substantially high efficiency may maintain the first polarizing direction after being reflected by the reflector 130, then pass through the waveguide display assembly 210 to be perceived by the eye 220 of the user via the eye-box.

In addition, when the reflector 130 is partially transparent and partially reflective, ambient light from environment may pass through the reflector 130 and the waveguide display assembly 210 to be perceived by the eye 220 of the user together with the image light with the substantially-high efficiency and reflected by the reflector 130. Because the linear polarizer is no longer disposed in the second optical path before the eye 220 of the user, the transmittance of the real-world objects viewed through the near-eye display may be significantly enhanced.

In one embodiment, as shown in FIG. 8, the image light 340 decoupled out of the waveguide display assembly 210 may be s-polarized image light. The decoupled s-polarized image light 340 transmitted into the first direction towards the reflector 130 may have substantially high efficiency, and the decoupled s-polarized image light 340 transmitted into the second direction towards the eye 220 may have substantially low efficiency. The s-polarized image light having the substantially low efficiency may not be perceived by the eye 220 of the user. The s-polarized image light having substantially the high efficiency may maintain the polarizing direction after being reflected by the reflector 130, then pass through the waveguide display assembly 210 to be perceived by the eye 220 of the user.

On the other hand, ambient light from real-world objects in the environment may be decomposed into right-circularly polarized light and left-circularly polarized light, each of which may maintain the polarization state after sequentially passing through the reflector 130 and the waveguide display assembly 210. Thus, the user may see both right-circularly polarized light and left-circularly polarized light of the ambient light, as well, as the reflected s-polarized image light with substantially high efficiency. Accordingly, the virtual object displayed by the waveguide display assembly 210 may be optically combined with a view of real-world objects.

Figure 9:
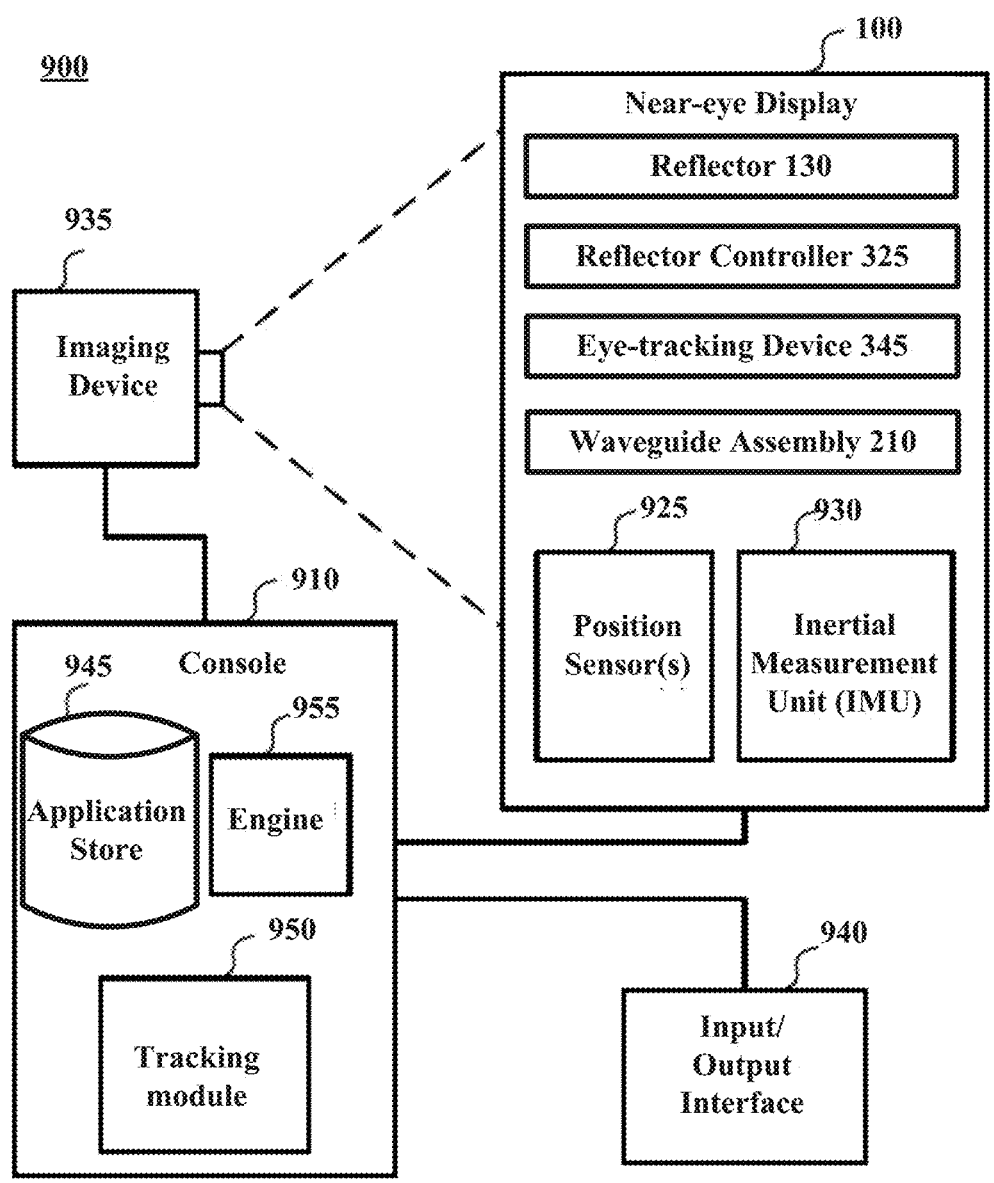
FIG. 9 illustrates a block diagram of an embodiment of a system including a near-eye display.

FIG. 9 is a block diagram of an embodiment of a system including an near-eye display. The system 900 may comprise a near-eye display 100, an imaging device 935, and an input/output interface 940 that are each coupled to a console 910.

The near-eye display 100 may be a display that presents media to a user. Examples of media presented by the near-eye display 100 may include one or more images, video, and/or audio. In certain embodiments, audio may be presented via an external device (e.g., speakers and/or headphones) that receives audio information from the near-eye display 100 and/or the console 910 and presents audio data based on the audio information to a user. In certain embodiments, the near-eye display 100 may also act as an AR eyewear glass. In certain embodiments, the near-eye display 100 augments views of a physical, real-world environment, with computer-generated elements (e.g., images, video, sound, etc.).

The near-eye display 100 may include a waveguide display assembly 210, a reflector 130, a reflector controller 325, an eye-tracking device 345, one or more position sensors 925, and/or an inertial measurement unit (IMU) 930. The waveguide display assembly 210 may include the source assembly 310, the output waveguide 320, and the source controller 330. The reflector 130 may have variable optical power for providing distance accommodation. The eye-tracking device 345 may track the user's eyes and provide eye-tracking information to the reflector controller 325. The reflector controller 325 may determine a vergence distance at which the eyes are currently focusing on, and control the reflector 130 to adjust the focal length, thereby enabling the virtual object to be perceived in focus at a distance corresponding to the vergence distance.

The IMU 930 may be an electronic device that generates fast calibration data indicating an estimated position of the near-eye display 100 relative to an initial position of the near-eye display 100 based on measurement signals received from one or more of the position sensors 925. The imaging device 935 may generate slow calibration data in accordance with calibration parameters received from the console 910. The imaging device 935 may include one or more cameras and/or one or more video cameras.

The input/output interface 940 may be a device that allows a user to send action requests to the console 910. An action request may be a request to perform a particular action. For example, an action request may be to start or end an application or to perform a particular action within the application. The console 910 may provide media to the near-eye display 100 for presentation to the user in accordance with information received from one or more of: the imaging device 935, the near-eye display 100, and the input/output interface 940. In one embodiment, as shown in FIG. 9, the console 910 may include an application store 945, a tracking module 950, and an engine 955.

The application store 945 may store one or more applications for execution by the console 910. An application is a group of instructions, that when executed by a processor, generates content for presentation to the user. Examples of applications may include: gaming applications, conferencing applications, video playback application, or any other appropriate applications.

The tracking module 950 may calibrate the system 900 using one or more calibration parameters and may adjust one or more calibration parameters to reduce error in determination of the position of the near-eye display 100. The tracking module 950 may track movements of the near-eye display 100 using slow calibration information from the imaging device 935. The tracking module 950 may also determine positions of a reference point of the near-eye display 100 using position information from the fast calibration information.

The engine 955 may execute applications within the system 900 and receive position information, acceleration information, velocity information, and/or predicted future positions of the near-eye display 100 from the tracking module 950. In certain embodiments, information received by the engine 955 may be used for producing a signal (e.g., display instructions) to the waveguide display assembly 210 that determines a type of content presented to the user.

Figure 10:
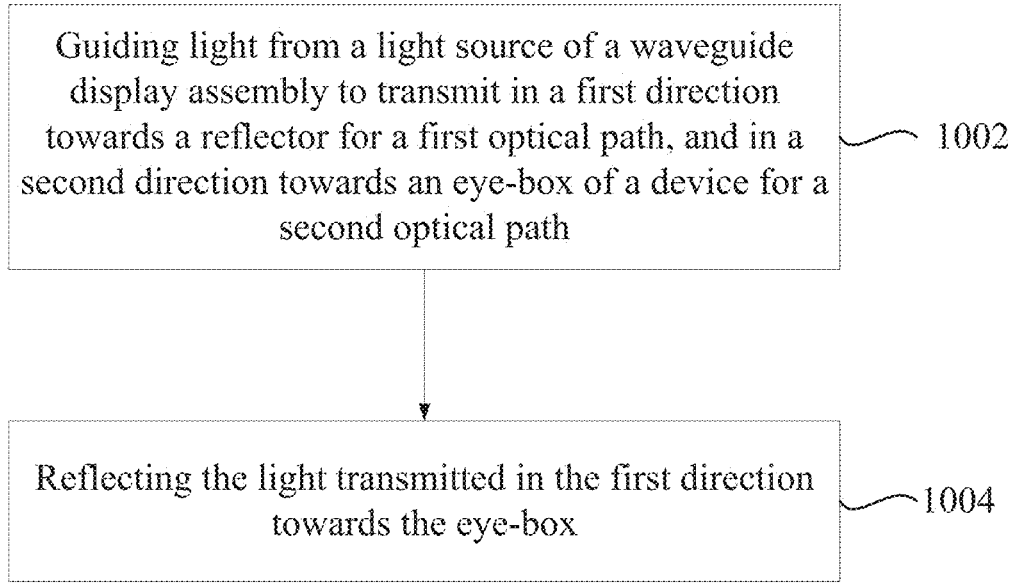
FIG. 10 illustrates an embodiment of a method for a near-eye display.

The present disclosure further provides a method for near-eye display. FIG. 10 illustrates an embodiment of a flowchart of a method for the near-eye display.

As shown in FIG. 10, in Step 1002, image light from a light source of a waveguide display assembly is guided to transmit in a first direction towards a reflector for a first optical path, and in a second direction towards an eye-box of a device for a second optical path.

In particular, the waveguide display assembly may be optically coupled to the reflector, and the reflector may have variable optical power. In Step 1004, the image light transmitted in the first direction is reflected by the reflector towards the eye-box.

In certain embodiments, the method may further comprise suppressing the light in the second direction while passing through the light in the first direction reflected by the reflector.

In certain embodiments, the reflector may have a shape (e.g., an optical interface formed by a deformable member and a reflective coating) that is adjustable to provide the variable optical power for the image light incident thereon. The method may further comprise reflecting the light transmitted in the first direction to pass through the eye-box to form an image including a virtual object displayed by the waveguide display assembly, and controlling the reflector to change a focal length of the reflector to change a distance at which the virtual object is perceived to be in focus.

In certain embodiments, the device may further include an eye-tracking device and a reflector controller. The method may further comprise tracking eyes of a user and to provide eye-tracking information; based on the eye-tracking information, determining a vergence distance where the user's eyes are currently focusing on; and based on the vergence distance, controlling the reflector to adjust the shape of the reflector, such that the virtual object is perceived to be in focus at the distance corresponding to the vergence distance where the user's eyes are currently focusing on.

In certain embodiments, the reflector may be partially reflective and partially transparent. The method may further comprise based on the eye-tracking information, determining a vergence distance where the user's eyes are currently focusing on a real-world object viewed through the device; and based on the vergence distance where the user's eyes are currently focusing on a real-world object viewed through the device, controlling the reflector to adjust the shape of the reflector, such that the virtual object is perceived to be in focus at the distance corresponding to the vergence distance where the user's eyes are currently focusing on the real-world object viewed through the device.

The present discourse provides a near-eye display including a reflector having variable optical power and a waveguide display assembly optically coupled to the reflector. The waveguide display assembly may guide light from the light source to transmit in a first direction towards the reflector for a first optical path, and in a second direction towards an eye-box of the device for a second optical path. The reflector may reflect the light in the first direction towards the eye-box. In particular, a vergence distance where the user's eyes are currently focusing on may be determined based on eye-tracking technology, and the focal length of the reflector may be adjusted accordingly. Thus, the virtual object displayed by the waveguide display assembly may be perceived to be in focus at a distance corresponding to the vergence distance.

Through adopting the waveguide display and the reflector having variable optical power, the physical display and electronics may be moved to the side (near the user's temples) and a fully unobstructed view of the real-world may be achieved, therefore opening up the possibilities to true AR experiences. Meanwhile, the reflector having variable optical power and the waveguide display optically coupled to the reflector may together form a varifocal display, in which the vergence-accommodation conflict in the near-eye display may be eliminated, and the viewing experience may be significantly enhanced in various application scenarios. A compact and lightweight near-eye display layout may be enabled, not only without mechanical moving components but also without compromising the accommodation range.

Further, a desired accommodation range of the near-eye display may be achieved by specifically designing the reflector, for example, through selecting an appropriate deformable member for the reflector and appropriate operation mechanism of the reflector. Then the reflector may be able to provide accommodation cues from optical infinity to as close as the near point of the eyes. Thus, no matter multiple virtual objects are displayed across a wide range of distances to the user from very close to far away, and/or when the display arguments a relatively close real-world scene with the virtual objects, the distance where the virtual object is perceived to be in focus may always match the vergence distance where the user's eyes are currently focusing on.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer).

Additionally, in certain embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In certain embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A device, comprising:
a reflector having variable optical power; and
a waveguide display assembly optically coupled to the reflector and including:
a waveguide optically coupled to a light source and configured to receive a light emitted by the light source;
a phase-modulator disposed between the waveguide and the reflector; and
a polarizer disposed between the waveguide and an eye-box of the device, wherein:
the waveguide is configured to output a first portion of the light having a first polarization toward the phase-modulator and the reflector, and output a second portion of the light having the first polarization toward the polarizer,
the phase-modulator and the reflector are configured to receive the first portion of the light having the first polarization from the waveguide, and output the first portion of the light having a second polarization toward the waveguide and the polarizer, and
the polarizer is configured to transmit the first portion of the light having the second polarization, and block the second portion of the light having the first polarization that is incident onto the polarizer.

2. The device according to claim 1, wherein the polarizer is configured to suppress the second portion of the light having the first polarization output from the waveguide while passing through the first portion of the light having the second polarization output by the phase-modulator and the reflector.

3. The device according to claim 2, wherein:
the light source is a narrow-bandwidth light source with a substantially-narrow spectral bandwidth, and
the reflector has a reflective coating matching the substantially-narrow spectral bandwidth of the light source.

4. The device according to claim 3, wherein:
the substantially-narrow spectral bandwidth is approximately 5-10 nm.

5. The device according to claim 1, wherein the reflector has a shape that is adjustable to provide the variable optical power.

6. The device according to claim 5, wherein:
the polarizer is configured to transmit the first portion of the light having the second polarization toward the eye-box to form an image including a virtual object displayed by the waveguide display assembly; and
the shape of the reflector is adjustable to change a focal length of the reflector to change a distance at which the virtual object is perceived to be in focus.

7. The device according to claim 6, further comprising:
a controller; and
an eye tracker configured to track eyes of a user and to provide eye-tracking information to the controller,
wherein the controller is configured to:
determine, based on the eye-tracking information, a vergence distance where the eyes currently focus on; and
control, based on the vergence distance where the eyes currently focus on, the reflector to adjust the shape of the reflector, such that the virtual object is perceived to be in focus at the distance corresponding to the vergence distance where the eyes currently focus on.

8. The device according to claim 6, further comprising:
a controller; and
an eye tracker configured to track eyes of a user and to provide eye-tracking information to the controller,
wherein the reflector is partially reflective and partially transparent, and
wherein the controller is further configured to:
determine, based on the eye-tracking information, a vergence distance where the eyes currently focus on a real-world object viewed through the device; and
control, based on the vergence distance where the eyes currently focus on the real-world object viewed through the device, the reflector to adjust the shape of the reflector, such that the virtual object is perceived to be in focus at the distance corresponding to the vergence distance where the eyes currently focus on the real-world object viewed through the device.

9. The device according to claim 5, wherein:
the reflector includes two substrates, a membrane, one or more optical fluids enclosed between each substrate and the membrane, and a reflective coating coated on the membrane, and
the membrane is a deformable member having an adjustable curvature.

10. The device according to claim 1, wherein:
the device is a component of a near-eye display.

11. The device according to claim 1, wherein:
the phase-modulator is configured to change a polarization of an incident light into a different polarization.

12. The device according to claim 11, wherein:
the phase-modulator is a quarter-wave plate,
the polarizer is a linear polarizer, and
the quarter-wave plate is oriented relative to the linear polarizer to convert the incident light between a linearly polarized light and a circularly polarized light for a visible spectrum and/or an infrared spectrum.

13. The device according to claim 1, wherein
the polarizer is also configured to:
block a first light having the first polarization scattered by an eye of a user;
transmit a second light having the second polarization scattered by the eye toward the waveguide,
the waveguide is configured to transmit the second light having the second polarization toward the phase-modulator and the reflector,
the phase-modulator and the reflector are configured to receive the second light having the second polarization from the waveguide, and output the second light having the first polarization toward the waveguide,
the waveguide is further configured to transmit the second light having the first polarization toward the polarizer, and
the polarizer is configured to block the second light having the first polarization received from the waveguide from entering the eye.

14. A method, comprising:
outputting, by a waveguide, a first portion of a light having a first polarization from a light source toward a phase-modulator and a reflector;
outputting, by the waveguide, a second portion of the light having the first polarization toward a polarizer;
receiving, by the phase-modulator and the reflector, the first portion of the light having the first polarization from the waveguide, and outputting the first portion of the light having a second polarization toward the waveguide and the polarizer;
transmitting, by the polarizer, the first portion of the light having the second polarization; and
blocking, by the polarizer, the second portion of the light having the first polarization that is incident onto the polarizer.

15. The method according to claim 14, wherein:
blocking, by the polarizer, the second portion of the light having the first polarization includes suppressing the second portion of the light having the first polarization.

16. The method according to claim 14, further comprising controlling, by a controller, the reflector to adjust a shape to provide the variable optical power.

17. The method according to claim 16, further comprising:
transmitting, by the polarizer, the first portion of the light having the second polarization includes transmitting the first portion of the light having the second polarization toward the eye-box to form an image including a virtual object displayed by the waveguide display assembly; and
wherein controlling, by the controller, the reflector to adjust the shape includes adjusting the shape to change a focal length of the reflector to change a distance at which the virtual object is perceived to be in focus.

18. The method according to claim 17, further comprising:
tracking, by an eye-tracking device, eyes of a user to provide eye-tracking information to the controller;
determining, by the controller, based on the eye-tracking information, a vergence distance where the eyes currently focus on; and
wherein controlling, by the controller, the reflector to adjust the shape includes controlling, based on the vergence distance where the eyes currently focus on, the reflector to adjust the shape of the reflector, such that the virtual object is perceived to be in focus at the distance corresponding to the vergence distance where the eyes currently focus on.

19. The method according to claim 17, wherein the reflector is partially reflective and partially transparent, the method further comprises:
tracking, by an eye-tracking device, eyes of a user to provide eye-tracking information to the controller;
determining, by the controller, based on the eye-tracking information, a vergence distance where the eyes currently focus on a real-world object; and
controlling, by the controller, based on the vergence distance where the eyes currently focus on the real-world object, the reflector to adjust the shape of the reflector, such that the virtual object is perceived to be in focus at the distance corresponding to the vergence distance where the eyes currently focus on the real-world object.

20. The method according to claim 14, wherein:
the light source is a narrow-bandwidth light source with a substantially-narrow spectral bandwidth; and
the reflector has a reflective coating matching the substantially-narrow spectral bandwidth of the light source.

* * * * *